INVENTOR.
Ellsworth A. Hosmer
BY
Lippincott & Smith.
ATTORNEYS

May 8, 1956 E. A. HOSMER 2,744,958

CARRIER TELEPHONE SYSTEM

Filed July 30, 1951 3 Sheets-Sheet 2

INVENTOR.

Ellsworth A. Hosmer

BY

Lippincott & Smith.

ATTORNEYS

May 8, 1956 E. A. HOSMER 2,744,958

CARRIER TELEPHONE SYSTEM

Filed July 30, 1951 3 Sheets-Sheet 3

INVENTOR.
Ellsworth A. Hosmer
BY
Lippincott & Smith
ATTORNEYS 2,744,958
Patented May 8, 1956

2,744,958

CARRIER TELEPHONE SYSTEM

Ellsworth A. Hosmer, Kenwood, Calif.

Application July 30, 1951, Serial No. 239,292

12 Claims. (Cl. 179—1)

Figure 1:
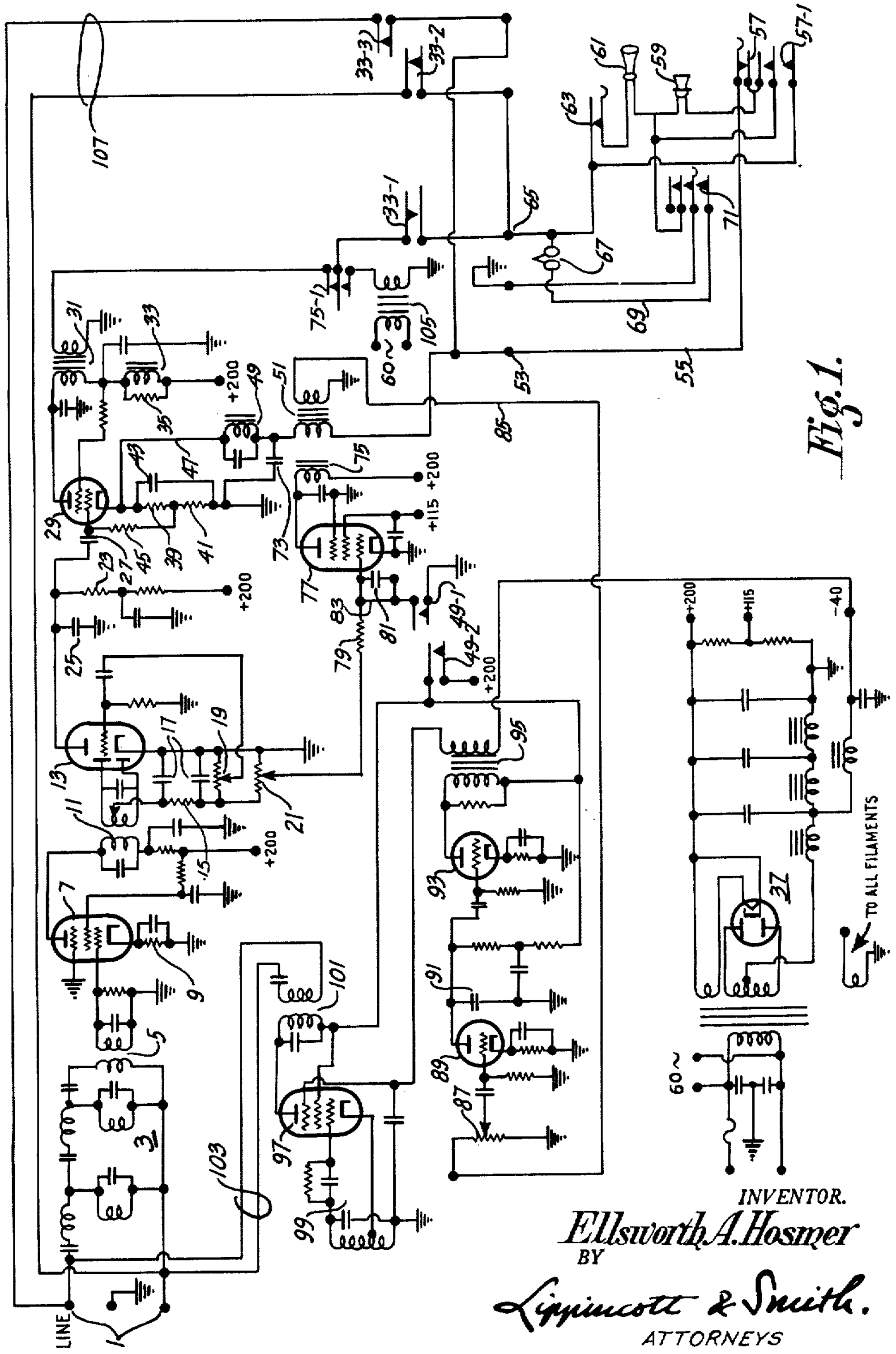

This invention relates to carrier current telephone systems, and specifically to such systems adapted primarily for use on individual subscriber lines.

Carrier current systems for use on toll lines are widely used. Such systems, being intended for use on long lines, are usually designed to get the greatest number of speech channels of high quality within a given frequency band. On a long line the cost of the terminal equipment required for each channel may be relatively small in proportion to the cost of an actual physical circuit. The lines on which they are used terminate, at both ends, in a central telephone office and terminating networks can be used which match the characteristic impedance of the line, with great exactness, over a wide band of frequencies. Moreover, the equipment is under the control of trained personnel at all times. All of these factors warrant the use of sensitive and delicate equipment which is relatively expensive and which is quite bulky.

Carrier systems for use on individual subscriber lines are not unknown, but in the past have not been sufficiently successful to gain wide acceptance. The most fruitful use for such subscriber carrier systems is upon rural telephone lines. Here again, as in the case of toll lines, the cost of the physical line itself is usually high in comparison with the cost of the terminal equipment but the revenue obtainable from any individual channel is relatively low. This has led to the use of party lines with large numbers of subscribers connected to each circuit. This, of course, involves a time division in the use of the physical circuit between the various subscribers. The transmission characteristics of such lines, e. g., their characteristic impedance, are not accurately predictable or uniform. Furthermore, the equipment, at the subscriber's end of the circuit at least, cannot constantly be supervised by skilled personnel.

Carrier current telephone service in rural areas obviously presents opportunities for giving much greater satisfaction to the individual subscriber than does party line service. A single physical circuit can carry a relatively large number of two-way speech channels and since these channels may be operated simultaneously the subscriber who possesses the carrier current terminal equipment obtains all of the advantages of individual service, particularly the advantages of privacy and of immediate availability at all times, regardless of whether the circuit is being used by some other subscriber.

In order to obtain these advantages, however, a number of requirements must be met which are not common to toll line carrier systems. A subscriber carrier system for rural use must be capable of operation on lines of varying characteristic impedance, it must be sufficiently rugged and trouble-free so that it will remain operative for long periods without expert service, it should not require any operating procedures on the part of the subscriber which are different from those to which he is accustomed in the normal use of his telephone instrument. Moreover, since the users of rural lines are usually more or less isolated and since the power lines which now customarily also serve rural subscribers are more vulnerable to service interruptions due to weather conditions than are those in urban communities, it is practically necessary that provision be made for the maintenance of emergency communication when either the power supply or the terminal equipment at the subscriber station fails to operate for any reason.

The objects of the present invention are to meet the requirements enumerated above; specifically, to provide a system of carrier current telephony which will deliver to the subscriber instrument and to the switchboard at the central office signals substantially identical with those delivered over a physical line; to deliver such signals when the subscriber instrument is manipulated in the ordinary manner, whether by merely lifting the telephone instrument from its hook (or cradle as the case may be) if the central office be a manual one or by lifting the instrument and dialing if a mechanical switching system be used; to provide a system wherein the terminal equipment at both the subscriber's and central office ends of the line is simple, rugged, inexpensive, unlikely to failure and, if failure does occur, easy to repair, and to provide a system wherein, if a failure of the carrier equipment or its power supply does occur, emergency service on a party line basis over the physical circuit to which the carrier system is connected is automatically provided.

In the present invention each carrier channel involves the use of two terminal units, one of which is inserted in the circuit between the physical line and the switchboard (either manual or automatic) at the central office. This unit will hereinafter be referred to as the "C. O." unit. The other unit is inserted between the line and the subscriber's telephone instrument and will hereinafter be referred to as the subscriber unit. Both the switchboard and the subscriber's telephone instrument may be completely standard in construction, the units being devised to deliver signals of precisely the same character as those which would me delivered by a normal voice frequency line. In order to accomplish this it will be obvious that both units will involve circuits which are, of themselves, incomplete, leading to terminals to which the standard equipment is connected, circuits being completed through the standard equipment mentioned.

It will be seen, therefore, that when the invention is in actual use the circuit is terminated at each end in telephone instrumentalities including a microphone, a telephone receiver, some sort of signalling device (which will usually be a bell at the subscriber station). At the central office end of the line it may be either a switchboard drop, in case of a manual system, or may include the automatic switch gear and a second subscriber's instrument in the case of a dial system. In either case the standard equipment will comprise some sort of an answering switch; either a hook switch or cradle switch at a subscriber's set or an answering key or relay at the central office.

The C. O. and subscriber units differ in some detail which will be set forth more completely hereinafter. In their essentials, however, both units comprise (starting from the line end of the circuits) a selective circuit or filter which is designed to pass a receiving carrier frequency. Coupled to the output of the selective circuit, preferably but not necessarily through a head amplifier, is a detector which has two functions. The first of these is to demodulate the received carrier and pass the modulation components on to the telephone instrument. The second is to derive, from the carrier itself, a potential which is used to actuate local means for exciting the signalling device. Means are actuated by the operation of the answering switch in the standard equipment for simultaneously disabling the local signalling source at the subscriber's station, disconnecting the signalling device itself and connecting the microphone and receiver in the ordinary manner, and, in addition, exciting a local oscillator for generating the transmission carrier frequency. Power for the local oscillator is preferably derived from an ordinary commercial A. C. source through a power supply of well known characteristics, but other types of power supply may be used if desired. The local oscillator may be of any stable type. Voice currents, derived from the microphone are applied to modulate this oscillator, preferably after preliminary amplification. The output of the oscillator is connected directly to the line, ahead of the selecting circuit. Preferably the subscriber's unit includes one additional and highly important feature; means are provided for connecting the subscriber's instrument directly to the line upon failure of the carrier unit, so that an emergency voice frequency channel is provided when such a failure occurs. Such means preferably comprises a relay in the output circuit of the final receiver amplifier tube, this relay including contacts which are closed only when the tube does not carry current, these contacts being included in the direct path between the instrument and the physical line. The same relay is also provided with contacts which are open when current does not flow through the amplifier tube but closed when current starts to flow and which connect the telephone instrument through the carrier equipment, the first-mentioned contacts opening and thus breaking the direct connection to the line when the second-mentioned contacts close.

In the C. O. unit the last-mentioned relay is omitted, but means are provided for performing certain additional functions. At the subscriber end of the circuit the transmitting oscillator is turned on only upon actuation of the answering switch by picking up the telephone receiver or hand set, whereas in the C. O. units the transmitter is excited directly upon receipt of the carrier from the subscriber end of the line irrespective of the operation of the answering switch at the central office or, alternatively, by the operation of the answering switch irrespective of the presence of an incoming carrier. Furthermore, the signalling control circuit is not disabled by the operation of answering, signalling being effected merely by closing the switchboard circuit and thus actuating the switchboard drop, or, in the case of an automatic system, by repeatedly opening and closing the circuit so as to actuate the dial-operated switches.

Figure 2:
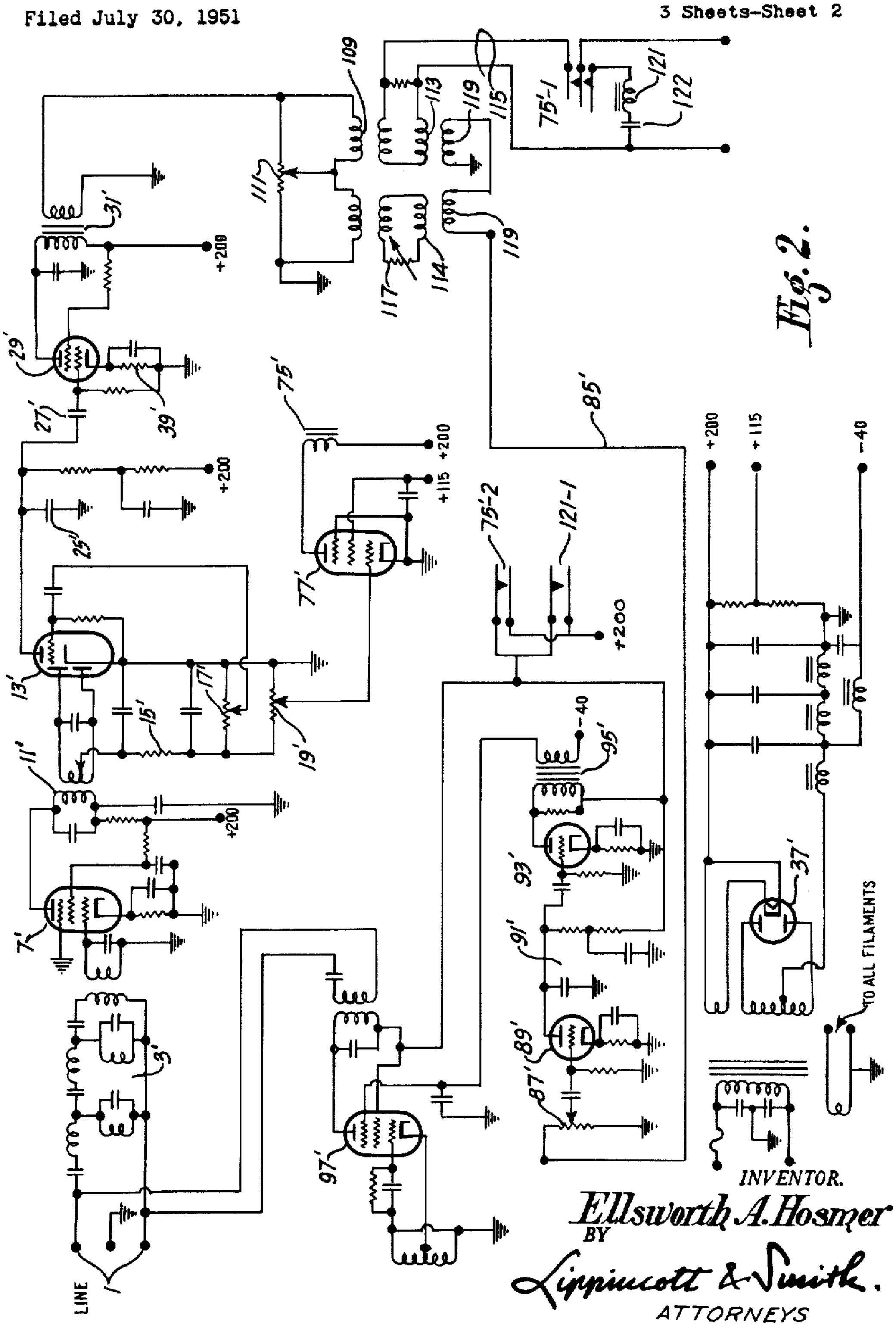
Figure 3:
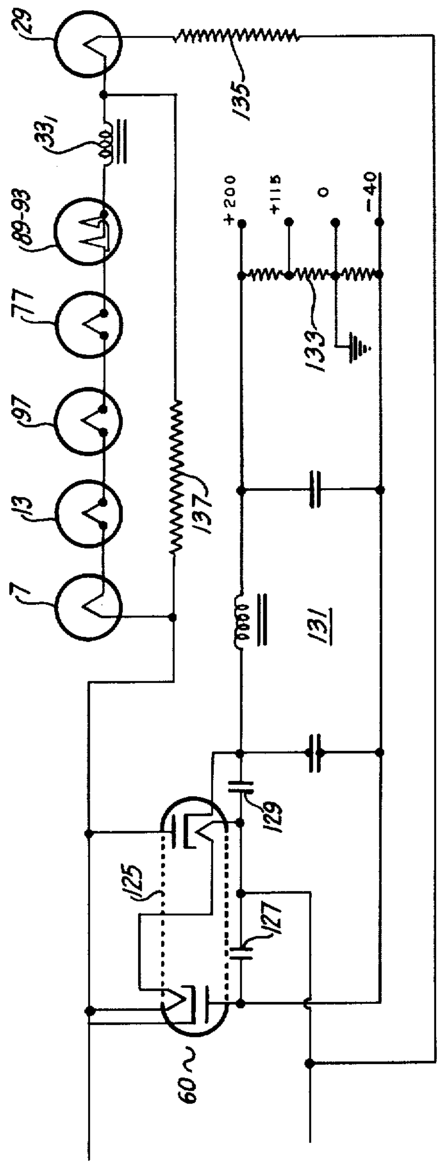

All of the above, however, will be better understood by reference to the ensuing detailed description of a preferred form of the apparatus of my invention, taken in connection with the accompanying drawings wherein:

Fig. 1 is a schematic drawing of a subscriber unit in accordance with the invention, a simplified diagram of the subscriber's telephone set being included in order to show the complete circuits necessary for actual operation of the device;

Fig. 2 is a similar schematic diagram of the C. O. unit, including the equipment between the terminals of the physical line and the two-wire leads to the telephone switchboard, the latter not being shown; and Fig. 3 is a schematic circuit diagram illustrating a modified type of power-supply for the system of this invention and incorporating a different means of transferring the subscriber's instrument from carrier operation to direct connection with the physical line on failure of such supply.

Considering first the subscriber unit shown in Fig. 1, the terminals 1, at the upper left-hand corner of the figure, are for connection to an ordinary two-wire telephone line which will usually, although not necessarily, also carry voice frequency messages. A ladder type band-pass filter 3, of known construction, connects directly to these terminals. The pass band of the filter 3 should be of the order of 6 kilocycles, i. e., it should have a pass band wide enough to accept the receiving carrier frequency and both of its accompanying side bands, the 6 kilocycle figure for the pass band being based upon the assumption that a full 3 kilocycle voice channel will be used. The band may, however, be decreased slightly if lower fidelity can be tolerated.

The filter 3 is terminated by a transformer 5, preferably of the step-up variety to match the characteristic impedance of the line and the filter to the input of an amplifier tube 7, this tube being shown as a pentode such as a 6BA6. The pentode 7 is shown as being self-biased through a bypassed cathode resistor 9. It feeds a doubly tuned carrier frequency transformer 11, the primary and secondary coils of which are so coupled as to give the transformer the desired band-pass characteristics.

The transformer 11 feeds a detector circuit of conventional type. In the circuit shown this is a double diode, balanced type circuit, wherein the two ends of the transformer secondary are connected to the two diode anodes in a multiple purpose tube 13 such as a 6AT6. The center of the secondary coil of the transformer 11 is tapped and connects to a network which is essentially a low-pass resistive-capacitive filter comprising a series resistance 15 between a pair of shunt capacitors 17, connecting from the center tap lead to the cathode of the tube 13. The network terminates in two parallel potentiometers, 19 and and 21 respectively, which serve as gain controls for the remainder of the equipment. Ordinarily these potentiometers are adjusted once for all at the time the unit is installed at the subscriber station.

The triode element of the multiple purpose tube 13 is fed through the contact of the potentiometer 19 with voice frequency potentials from the detector network. The triode section feeds a conventional resistance-capacitance coupling network, including an anode resistor 23, bypassed by a small condenser 25 for removing any residual carrier frequency components, and the usual grid blocking condenser 27 connecting to the control grid of a amplifier tube 29.

The tube 29 is shown as a tetrode, such as a 6AQ5. The primary coil of standard type of voice frequency transformer 31 is connected to the anode of this tube. The low potential end of this primary coil connects through a relay coil 33, shunted by a resistor 35, to the positive high potential lead of a conventional type power supply 37, adapted for connection to the usual 60 cycle power mains. This power supply serves all of the tubes in the unit with all necessary biasing potentials for their various electrodes. In order to simplify the diagram most of the connections between the power supply and the various tubes are omitted. The power supply terminals are, instead, labeled with the nominal voltages developed thereat and the plate circuits of the various tubes involved carry like voltage designations. The filament circuits of the various tubes are also omitted as being purely conventional and well understood in the art. It may be mentioned here that a somewhat related convention is used in showing the various relays employed in the device. The coils are shown in their proper positions in the circuit and are designated by their proper reference characters. The circuits controlled by these relays are drawn as directly as possible between the elements they connect and the relay contacts are shown therein separated from the coils which control them but are designated by the same reference characters followed by a dash and a distinguishing numeral. This avoids confusing crossing and recrossing of circuits.

The cathode circuit of tube 29 includes a pair of series resistors, 39 and 41 respectively, through which the cathode is connected to ground. Both of these resistors are bypassed by a relatively large condenser 43 at least 1 microfarad in capacity. The control grid of tube 29 is biased through a grid resistor 45 by the drop through resistor 39. The drop across both of the resistors together supplies potential for actuating the microphone in the subscriber's telephone instrument. This potential is applied through a lead 47 which connects from the cathode of tube 29, the coil 49 of a relay and the primary of a modulating transformer 51 to tip terminal 53 for connection to the telephone instrument.

The subscriber's instrument, through which the circuit is completed, may be of any type which is in general commercial use. That shown is of the side tone type, as side tone is largely absent owing to the circuitry employed in the unit, but anti-side tone instruments may equally well be used. Only the essential circuits are shown. These include the tip lead 55 which connects, through interrupter contact 57 of a dial mechanism if the latter be used, to a microphone 59 in series with a receiver 61 and thence through one pair of contacts 63 of a hook or cradle switch to the ring terminal 65. The signalling circuit, in this case comprising a bell 67, connects through lead 69 and a second set of contacts 71 on the answering hook or cradle switch to ground; when these contacts are opened by removing the instrument from the switch the ground connection is transferred to the midpoint between the microphone 59 and the receiver 61, as is common practice.

It will thus be seen that with the receiver off of the hook the microphone circuit can be traced from ground through the hook-switch contact 71 to the microphone, thence through the dial contacts 57, leads 55 and 53 to the modulator transformer. From the transformer the voice component to the microphone currents are bypassed through a condenser 73 to the grounded side of the cathode resistor 41, while the D. C. component passes through the relay coil 49 to the cathode of tube 29.

The telephone receiver circuit may be traced from the grounded end of the secondary of transformer 31 through the secondary coil, thence through two pairs of relay contacts 75–1 and 33–3, both of which are operated by relay coils whose function will later be described, to ring terminal 65, through hook-switch contacts 63, telephone receiver 61 and so back to ground through hook-switch contact 71.

Returning now to the detector circuit, the second branch, comprising the potentiometer 21, feeds the control electrode of a signal-control tube 77 through a resistor 79. The tube 77 is preferably a pentode, such as a 6AU6, the cathode of which is connected directly to ground so that it normally conducts. A condenser 81 connects from the control grid to ground and bypasses a major portion of the voice component of the detector voltage. The anode of tube 77 connects through the coil of relay 75, this being the relay which operates contacts 75–1 already described in the telephone relay circuit, and, when this relay is excited, holds the contacts in the position shown.

What may be considered as the receiving side of the equipment is completed by a connection 83 from the control grid of tube 77 which, when relay 49 in the microphone circuit is excited, connects to ground through contact 49–1 of this relay. It will therefore be seen that when the receiver is off of the hook and the microphone circuit is completed through the hook-switch these contacts will be closed so that no potential can be applied to the grid of the signal-control tube 77. When the receiver is on the hook and the microphone circuit is open these contacts will also open so that potentials may be applied to the control grid.

Turning now to the transmitting side of the circuit, the secondary of the modulating transformer 51 has one terminal connected to ground and the other terminal connects, through a lead 85, to a gain control 87 and thence to the control grid of a triode amplifier 89 through a conventional resistance-capacitance coupling. Tube 89 may be a separate triode, but is more conveniently one-half of a dual triode such as a 12AU7. The anode of the section 89 is coupled through a conventional resistance-capacitance network 91 to the input of the second section 93 of the dual triode. The output of this latter triode section is transformer-coupled through transformer 95 to one grid of a pentode 97. This pentode is provided with a conventional oscillating circuit 99, tuned to generate a transmitting carrier frequency which differs from that accepted by the selective circuit 3. The oscillations generated in the tube 97 are grid modulated by the output of the amplifier 93. A doubly tuned, carrier-frequency transformer 101 has its primary connected in the anode circuit of tube 97; its secondary connects to the line terminals 1 through leads 103.

Plate potential for all of the tubes 91, 93 and 97 in the transmitting chain is derived from the supply 37 through contacts 49–2 of the relay 49, these contacts opening and rendering the transmitter chain active when relay 49 is deenergized by placing the telephone receiver on the hook-switch and opening the microphone circuit.

The operation of the unit may now be described. With the receiver on the hook, i. e., with the answering switch in the signalling position, an unmodulated carrier of the receiving frequency is applied to the line. This is amplified by tube 7, detected by tube 13, and places a negative potential on the grid of the signal control tube 77. This cuts off the normally conducting tube, de-energizes relay 75, and allows the contacts 75–1 of this relay to fall back from the position shown and complete a circuit through the other of the two relay contacts and the secondary coil of a transformer 105 whose primary is supplied from the A. C. lines in parallel with the input to the power supply 37. Alternating current is therefore applied through relay contacts 33–1, terminal 35, the bell 67, the lower contact 71 of the hook-switch and back to the transformer secondary through the ground connection. The bell or other signal 67 is thus actuated as often and for as long a period as carrier pulses are applied and the answering switch remains in the signal position.

As soon as the receiver is lifted from the hook the microphone circuit is completed and relay coil 49 is excited. This closes relay contacts 49–1 and grounds the grid of tube 77, thus permitting it to conduct once more and operate the contacts 75–1, opening the secondary circuits of transformer 105 and transferring the ring connection of the telephone instrument to the output coil of the transformer 31. At the same time contacs 49–2 are also closed, applying plate potential to the oscillator tube 97 which generates the answering carrier. The generation of the transmitting frequency indicates at the other end of the line that the subscriber has answered and conversation can be carried on in the normal manner. Replacing the receiver on the hook de-energizes relay coil 49, opens the contacts 49–1 enabling tube 77 again to receive a signal and also opens contacts 49–2, cutting off the transmitting carrier and thus re-establishing the initial condition of the circuit.

If no carrier is being received and the subscriber lifts his receiver from the hook, relay 49 is actuated as before, exciting the oscillator 97 to place the transmitting carrier on the line. In case the central office is the manual type the presence of the carrier actuates a switchboard drop, as will later be described. If the central office is an automatic exchange, operation of the dial first closes the cam contacts 57', shunting out the transmitter and receiver, and then opens and closes contacts 57 to interrupt the circuit through relay 49 and pulse the oscillator 97 through concurrent actuation of the contacts 49–2.

There remains to be described the means employed for giving emergency service in case of failure of the power supply 37. A branch circuit 107 connects from the contacts 53 and 55 respectively to the line terminals 1, around the entire subscriber unit. Each side of this circuit includes a pair of contacts, 33–2 and 33–3 respectively, which are opened when relay coil 33 in the plate circuit of tube 29 is excited, but are otherwise closed. Tube 29 normally carries current at all times, and thus the bypass circuit 107 is normally open. Upon failure of the power supply or of the tube 29, however, the contacts 33–2 and 33–3 close, connecting the subscriber's telephone set directly across the line. At the same time relay contacts 33–1 open, disconnecting the telephone receiver from the secondary of transformer 31. Microphone current is supplied from the common battery type of switchboard in the usual manner. The instrument can therefore be used on a party line basis, until carrier service can be restored. In some cases the telephones on the physical circuit will be of a different type from the instruments used with the carrier equipment, particularly with respect to the signalling frequency used. In this case, although the subscriber can call the central office, he cannot himself be signalled to receive incoming calls. For emergency service, however, outgoing calls are ordinarily sufficient, but under special circumstances the line 107 may be disconnected from terminals 53 and 65 and connected to a stand-by instrument of the appropriate type.

The major portion of the equipment in the central office unit is identical with that which has been described in connection with the subscriber unit, and is therefore designated by the same reference characters distinguished by accents. The band-pass filter 3′ differs from the band-pass filter 3 only in the mid-frequency to which it is tuned, i. e., that of the oscillator 97 at the subscriber unit. The pre-amplifier, detector, and voice frequency amplifiers and their coupling networks are identical in character with those at the subscriber unit and will not again be described. The first difference comes in the cathode circuit of the output tube 29′, the cathode being grounded only through the normal cathode resistor 39′, the additional resistor being omitted since the unit is not required to furnish microphone current. Relay 49 is also dispensed with. The second difference is in the output circuit of the transformer 31′; this transformer feeds one coil 109 of a hybrid transformer, this coil being bridged by a balancing potentiometer 111. The winding 109 is coupled to coils 113 and 114, the first of which feeds a line 115, leading to the switchboard, while the second connects to a balancing network (which may, in this case, be a simple resistor) 17. The third winding 119 of the hybrid transformer is connected differentially with respect to the coils 109 from ground through lead 85′ to the gain control 87′, feeding the modulating amplifier and the oscillator 97′ in exactly the same manner as in the case of the subscriber unit. Oscillator 97′ differs from oscillator 97 only in that it is designed to generate a different frequency, i. e., that passed by the filter 3.

The signal control tube 77′ differs from the one in the subscriber unit only in that no means is provided for disabling it by actuation of the answering circuits. While the function of relay 75′ is the same as that of 75 in that it actuates the signalling circuit, the requirements of signalling at the central office are different and its contacts are, accordingly, differently arranged. In the C. O. unit this relay has two sets of contacts, one of which, designated as contacts 75′–1, are in circuit with the line 115 connecting to the switchboard. Contacts 75′–1 include a normally open and a normally closed pair. The first pair, which is open whenever the relay 75′ is excited, closes when a carrier current is received and completes the circuit from the switchboard through coil 113. At other times they open, as shown in the diagram, interrupting the D. C. path through the switchboard and, at the same time, close the second pair and complete a shunt circuit from the switchboard through a relay coil 121. Another set of contacts 75′–2 serve to connect the transmitting amplifier chain and oscillator to the power supply 37′ whenever relay coil 75′ is de-energized by the receipt of a carrier. Contacts 122–1 are connected in parallel with contacts 75′–2, and serve to turn on the transmitting carrier whenever relay 121 is excited by the application of ringing current from the switchboard. Relay 121 is not excited by D. C. since it is connected in series with a blocking condenser 122.

The general operation of the C. O. unit will be clear in view of the explanation of the subscriber unit operation which has already been given. When the subscriber lifts his receiver from the hook his carrier frequency is immediately turned on. This excites the detector 13′ and blocks tube 77′, actuating relay 75′ and turning on the oscillator 97′, at the same time completing the D. C. path through the switchboard drop. In the case of a dial system the pulsing of the carrier at the subscriber unit simultaneously pulses relay 75′ and the switchboard circuit in the same manner as would occur were the dial circuit coupled directly into the switchboard circuits. When the call is answered, either by a manual operator or by another subscriber in the case of a dial system, the conversation can take place exactly as in the case of a voice frequency channel.

In case the call originates (as far as the C. O. unit is concerned) at the switchboard, ringing current is applied, as usual, to the switchboard line. This actuates relay 121, and turns on the oscillator 97′ as long as the current is applied, turning it off again as soon as ringing current ceases. This, it will be remembered, serves to actuate the subscriber signal until the latter lifts his receiver, starting his own transmitting generator, blocking tube 77′, actuating the relay contacts 75′–1 to complete the voice circuit and de-activate ringing relay 121, at the same time completing the parallel path from the power supply to the oscillator through contacts 75′–2.

Since the central office equipment is attended and will normally be equipped with emergency power supplies no means is provided at the central office for supplying emergency service. The physical line will normally carry at least one voice frequency channel and the emergency operation at the subscriber end of the line will signal at the switchboard outlet provided for the voice frequency channel, effectively merely adding another party to the line. Five or more carrier channels may be imposed upon one physical pair, each of these channels being provided with its own pair of operating frequencies, transmitting and receiving, the various filters being connected in parallel with the line.

While the overall operation of the system of my invention has been shown and discussed above in connection with a preferred embodiment thereof, there are certain features which contribute materially to its satisfactory adjustment and reliability which should be more fully discussed even though they are implicit and possibly evident to one skilled in the art.

The first of these is the stand-by feature. All of the tubes shown are of the type using indirectly heated cathodes, with no internal connection between cathode and heater. Connection of the heaters in parallel to a 6 volt winding in the most conventional manner will adequately take care of the most usual types of interruption of service, i. e., those due to interruption of power or failure of the rectifier tube in the power pack. A burn-out in tube 29, the final amplifier in the receiver chain, will also cause transfer to the stand-by condition. Failure of other tubes in the system will not accomplish the transfer, however, and while the protection afforded by the parallel filament arrangement is well worth while it is not complete.

Practically all tube failures which occur suddenly are due to burn-outs. Therefore practically complete stand-by protection can be afforded by the very simple expedient of connecting the heaters of all of the tubes except the rectifier (and this latter also, if desired) in series. Under these circumstances the burn-out of any tube will de-energize all of the heaters and thus interrupt the plate current through tube 29 and relay 33 and accomplish the transfer. The relay may, of course, be included in the anode circuit of any of the tubes in the receiver chain, although I prefer to use it in the position shown.

Where the heater current drawn by the various tubes is not the same the simple series heater circuit must be modified slightly. In the case of the tubes suggested above tube 29 draws 0.45 ampere heater current, while all the rest draw 0.30 ampere, provided the heaters of the dual tube 12AU7, represented in the figures as tubes 89 and 93, be connected in parallel. In this case the series circuit would require the slight modification mentioned, but as substantially the same modification is used in the transfer circuit embodied in Fig. 3 next to be described a separate figure is thought unnecessary.

Fig. 3 illustrates the application of a "transformerless" power supply using a voltage doubler arrangement. A double-diode rectifier 125, such as a 117Z3 is used, its heaters being connected directly across the 115 v. A. C. line. The diode elements are connected across the line in opposite directions in series with condensers 127 and 129 respectively to charge them in opposite senses. They discharge into a conventional filter circuit 131, and the various potentials required by the tubes in the unit are derived from a voltage divider 133.

The heaters of all of the tubes are connected in series with a resistor 135 across the line as indicated, each tube being identified by the same reference character as in Fig. 1 but only the heater circuits being shown. Assuming the tubes above specified to be employed, each has a heater drop of 6.3 volts, so the drop across the series will total about 38 volts, and the resistor 135 must provide the remaining 77 volts. A resistor of 175 ohms will give this drop at a current of 0.45 ampere as required by tube 29. The other tubes consume only 0.30 ampere each and their heaters are therefore shunted by another resistor 137 of about 210 ohms. This will carry the additional 0.15 ohm with the required drop of 31.5 volts. If, however, one of the shunted heaters burns out the resistors 135 and 137 in series will carry only about 0.33 ampere, which is insufficient to excite tube 29 and would cause relay 33 to operate were the arrangement of Fig. 1 employed.

In the present instance, however, the transfer relay coil 331 is connected in series with the 0.30 ampere heaters in shunt with the resistor 137. It will be seen that a burn-out of any of the tubes will interrupt the relay current and effect a transfer of the telephone to the stand-by circuit, the relay contacts in this case being included in the circuit in the same positions as those of the relay 33 in Fig. 1.

One effect which would cause annoyance and inconvenience, were not steps taken to avoid it, is ringing of the signal bell when the power supply is re-established after a failure. The tubes do not become operative immediately, owing to the heating-time of the cathodes, and since the tube 77 does not carry current until its cathode is fully heated the ringing contacts of the relay 75 are closed. It is in order to prevent ringing of the bell until conduction is established that the contacts 33–1 are in series with contacts 75–1 in the ringing circuit. Therefore the latter does not close until the tube 29 becomes fully conductive and carrier service is re-established, by which time the tube 77 is also conducting and contacts 75–1 in this circuit are open. That this may certainly be the case is assured by the choice of the tube 77, that used having a shorter warm-up time than tube 29. This feature is not inherent when the transfer circuit illustrated in Fig. 3 is used, which is a principle reason for using the circuit of Fig. 1 for most services. There are occasions, however, where it is desirable that there be an audible indication that carrier service has been re-established, and this can be accomplished by using the transfer arrangement of Fig. 3.

One aditional point which should be mentioned has to do with the signal control tube 77. This has been described as normally conducting, but biased negatively to cut-off when a carrier is detected. It may, however, be used in the opposite manner by biasing it normally substantially to cut-off and applying the detected carrier in the positive sense to the control grid to cause it to conduct. This arrangement has been successfully employed in experimental equipment, and it automatically avoids ringing of the signal bell when carrier service is re-established after an interruption. However I have found the arrangement first described less critical of adjustment and therefore prefer it for general use.

It will be understood that while tube type designations have been given in the above description and specific operating potentials suitable for operating these tubes are indicated in the drawings, these are merely illustrative. Similarly there is a wide choice of detector, oscillator and amplifier circuits available for use in a device of this type. Modifications in such elements are contemplated as within the scope of this invention as defined in the following claims:

I claim:

1. A carrier current telephone system for operation on individual subscriber circuits including a microphone, a telephone receiver, a signalling device and an answering switch for transferring connections between the signalling device and the microphone and telephone receiver; comprising a filter for selecting a receiving carrier frequency, a detector connected to said filter, a local source of current for actuating said signalling device, means responsive to current from said detector for connecting said source to said signalling device comprising a vacuum tube having a control electrode and having an output circuit which may be changed from a conductive state to a substantially non-conductive state by changing the potential on said control electrode, means for normally biasing said control electrode to produce one of said states, means responsive to said detector current to change the potential of said electrode to produce the other of said states, a relay in said output circuit and responsive to changes of state therein, said relay including a pair of contacts which are open when said circuit is in the state produced when said control electrode is normally biased and closed when the potential of said electrode is changed in response to detector current, said signalling current source being connected in series with said contacts, and means actuated by said answering switch for disabling said detector-current responsive means.

2. A system in accordance with claim 1 wherein said detector current responsive means comprises a vacuum tube having a control element normally biased to permit conduction through said tube, and a circuit connecting said control element and said detector and poled to bias said tube toward cut-off by operation of said detector.

3. A system in accordance with claim 1 including a resistor connected between said detector and said control electrode, and means responsive to operation of said answering switch to the answering position thereof for connecting said control electrode directly to bias said electrode to its normal state.

4. A system in accordance with claim 2 including means responsive to operation of said answering switch for grounding the control electrode of said normally conducting tube.

5. A system in accordance with claim 1 including a local oscillator for generating currents of transmitting carrier frequency and a local source of current for energizing said oscillator and wherein said disabling means includes means for simultaneously connecting said control electrode directly to re-establish normal bias and connecting said oscillator and current source when said answering switch is in answering position.

6. A system in accordance with claim 1 including a local oscillator for generating currents of transmitting carrier frequency, a local source of current for energizing said oscillator, means controlled by said answering switch for supplying current for said microphone, a relay in series with said microphone and current supplying means, and contacts on said relay for simultaneously grounding said control electrode and connecting said oscillator and said source when said relay is energized.

7. A carrier current telephone system for operation on individual subscriber circuits including a microphone, a telephone receiver, a signalling device and an answering switch for transferring connections between the signalling device and the microphone and telephone receiver; comprising a filter for selecting a receiving carrier frequency, said filter having terminals for connection to a physical line, a detector connected to said filter, an amplifier tube fed from said detector and terminals for connecting a telephone set to the output of said amplifier tube; a local oscillator for generating carrier currents of transmitting frequency having an output circuit connected to said line terminals, means connected to said telephone set terminals for modulating the output of said oscillator, a local source of current connected to supply both said oscillator and said amplifier tube, and means operative upon interruption of current through said amplifier tube for connecting said telephone set terminals directly to said line terminals.

8. A system in accordance with claim 7 including means operative on interruption of current through said amplifier tube for disconnecting said amplifier from said telephone set terminals.

9. A carrier current telephone system for operation on individual subscriber circuits including a microphone, a telephone receiver, a signalling device and an answering switch for transferring connections between the signalling device and the microphone and telephone receiver; comprising a filter for selecting a receiving carrier frequency, said filter having terminals for connection to a physical line, a detector connected to said filter, an amplifier tube fed from said detector and terminals for connecting a telephone set to the output of said amplifier tube; a local oscillator for generating carrier currents of transmitting frequency having an output circuit connected to said line terminals, means connected to said telephone set terminals for modulating said oscillator, a local source of current connected to supply both said oscillator and said amplifier tube, a relay connected in the output circuit of said amplifier tube, and contacts on said relay connected to transfer the connection of said telephone set terminals from said amplifier and modulating means directly to said line terminals.

10. A carrier current telephone system for operation on individual subscriber circuits including a microphone, a telephone receiver, a signalling device and an answering switch for transferring connections between the signalling device and the microphone and telephone receiver; comprising a selective circuit for passing a received carrier frequency, terminals for connecting said circuit to a physical line, means connected to said selective circuit for detecting a modulating component in received signals passing said selective circuit, vacuum tube means for amplifying said modulating component after detection, output terminals for said amplifying means for connection to the terminals of a telephone instrument, a local vacuum tube means for generating oscillations of a transmitting carrier frequency having an output circuit connected to said line terminals; means connected to said telephone instrument terminals for modulating the output of said generating means, a local source of current for supplying said vacuum tube means, and means operative upon interruption of current in one of said vacuum tube means for connecting said telephone instrument terminals directly to said line terminals.

11. A carrier current telephone system for operation on individual subscriber circuits including a microphone, a telephone receiver, a signalling device and an answering switch for transferring connections between the signalling device and the microphone and telephone receiver; comprising a filter for selecting a receiving carrier frequency, said filter having terminals for connection to a physical line, a detector responsive said receiving carrier frequency and an output circuit adapted to feed voice frequency components from said detector to said telephone receiver; a local oscillator for generating a transmitting carrier frequency, means fed by said microphone for modulating the output of said oscillator and a local source of power for exciting said oscillator; a local source of signalling current, means actuated from said detector for connecting said signalling current source to said signalling means; means operative upon actuation of said answering switch for simultaneously disabling said signalling connecting means and connecting said power source to said oscillator, means operative upon failure of power from said source for transferring said receiver and microphone to direct connection to said physical line terminals and for additionally disconnecting said signalling means and current source, whereby said signalling means is maintained in inoperative condition until current from said power source is established.

12. A system in acordance with claim 11 wherein said signalling connecting means includes a vacuum tube having an output circuit, and a relay connected in said output circuit, said relay including a pair of contacts open in the normal condition of said tube, and said transferring means includes a circuit fed from said power supply and a relay in said circuit having a pair of contacts closed when said circuit is excited, both of said pairs of contacts being connected in series between said local signalling source and said signalling device.

References Cited in the file of this patent

UNITED STATES PATENTS

| | | |
|---|---|---|
| 2,396,990 | Dysart | Mar. 19, 1946 |
| 2,481,915 | Edson et al. | Sept. 13, 1949 |
| 2,484,211 | Emling | Oct. 11, 1949 |
| 2,487,455 | Lesti | Nov. 8, 1949 |
| 2,516,763 | Edson et al. | July 25, 1950 |

Dedication 2,744,958.—*Ellsworth A. Hosmer*, Kenwood, Calif. CARRIER TELEPHONE SYSTEM. Patent dated May 8, 1956. Dedication filed July 5, 1963, by the assignee, *Lenkurt Electric Co., Inc.*

Hereby dedicates to the public the full term of said patent.

[*Official Gazette August 27, 1963.*]